Feb. 15, 1966 YASUYOSHI IMAI ET AL 3,235,803
APPARATUS FOR CONTINUOUSLY APPLYING PRELIMINARY VOLTAGE IN
CONTINUOUSLY MEASURING APPARATUS FOR SEMICONDUCTOR DEVICES
Filed Sept. 27, 1961                                        2 Sheets-Sheet 1

INVENTORS
Yasuyoshi Imai
Osamu Kubouchi
Itaru Yasue

BY *Fisher, Christen &*
*Sawson*

United States Patent Office 3,235,803
Patented Feb. 15, 1966

3,235,803
APPARATUS FOR CONTINUOUSLY APPLYING PRELIMINARY VOLTAGE IN CONTINUOUSLY MEASURING APPARATUS FOR SEMICONDUCTOR DEVICES
Yasuyoshi Imai, Kanagawa-ku, Yokohama, Osamu Kubouchi, Tokyo, and Itaru Yasue, Kawasaki-shi, Japan, assignors to Tokyo Shibaura Electric Co., Ltd., Kawasaki-shi, Japan, a corporation of Japan
Filed Sept. 27, 1961, Ser. No. 141,057
2 Claims. (Cl. 324—158)

The present invention relates to apparatus for preheating semiconductors having one or more junctions to be used in characteristic testings thereof.

The present invention is intended for the provision of such apparatus which is adapted to preheat a succession of semiconductors for a predetermined time by conveying them while applying a predetermined voltage thereto.

In general, the characteristic curve of a semiconductor, which is obtainable by plotting the relation of electric current versus time when a reverse voltage is applied to the semiconductor, varies with the type thereof, and a certain period of time must elapse before the current is stabilized to have a definite value. On this occasion, if the voltage application is interrupted and then resumed, the current value does not follow the same characteristic curve nor is restored to the same level as taken at the time when the voltage application is interrupted. In testing semiconductors for their reverse or negative characteristics, therefore, it is necessary to preheat the semiconductors by applying a certain reverse voltage thereto for a predetermined time period. The reverse voltage may be used for all semiconductors but is preferably employed for germanium transistors or diodes of which the negative characteristics drift substantially.

Previous preheating apparatus for the purpose, however, have had a deficiency that they were extremely low in efficiency as a single semiconductor was inserted in one measuring device and held therein for a predetermined time for preheating.

In view of the above deficiency of previous apparatus of the kind, the present invention has for its object to provide an improved apparatus for preheating semiconductors which is automatic, easy to operate and adapted to provide uniform testing conditions.

According to the present invention, there is provided an apparatus for preheating semiconductors comprising an interrupted guide track including a number of aligned longitudinally spaced apart slide guides, said slide guides including each a plurality of spaced parallel rail sections and connected with respective voltage sources to form respective independent electric circuits, and a plurality of longitudinally spaced apart socket members arranged slidably along said interrupted guide track and interconnected so that a spacing is maintained between each two adjacent socket members which corresponds to the longitudinal extent of at least one slide guide, each of said socket members being adapted to carry a semiconductor holding the latter connected in said electric circuits in succession, whereby semiconductors may be preheated while being moved along at a suitable speed with the terminals thereof fitted in the respective socket members.

The above and other objects, features and advantages of the present invention will be apparent from the following description when read with reference to the accompanying drawings, in which.

Figure 1:
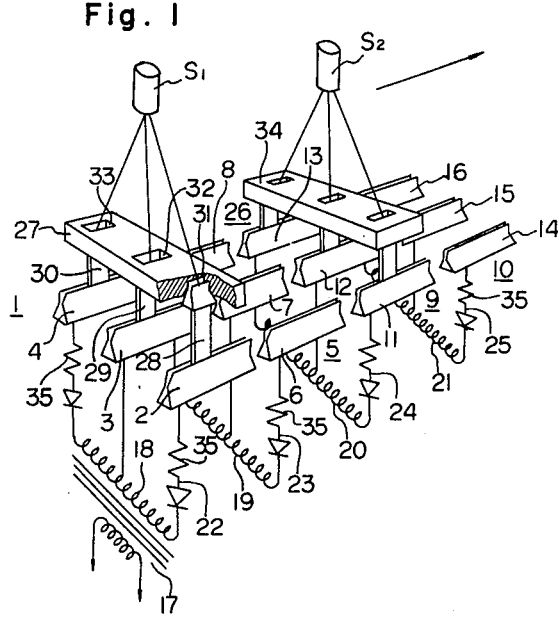
FIG. 1 is a fragmentary schematic perspective view of a portion of an apparatus embodying the present invention.

In the drawings, there is shown an apparatus for preheating semiconductors comprising a number of slide guides 1, 5, 9 and 10 including spaced parallel electroconductive rails sections 2–3–4, 6–7–8, 11–12–13 and 14–15–16, respectively. These slide guides 1, 5, 9 and 10 are connected with secondary windings 18, 19, 20 and 21, respectively, of a transformer unit 17 to form independent electric circuits 22, 23, 24 and 25, respectively. It is to be understood that these electric circuits may not necessarily be energized by respective secondary windings of a common transformer as shown, but may be energized in any other suitable manner. The slide guides 1, 5, 9 and 10 each arranged as described above are aligned in longitudinally spaced apart relation to each other to form an interrupted slide track 26.

Numeral 27 designates a socket member formed with through apertures 31, 32 and 33 to receive terminals of a semiconductor with contact fingers 28, 29 and 30 firmly fitted in said apertures so as to slidingly contact the respective rail sections of the slide track 26. Another socket member 34 is provided which is of the same construction as the first socket member 27. It will be understood that these socket members 27 and 34 are interconnected with each other in a suitable manner so as to be slidable along the interrupted guide track 26 while maintaining a spacing between the two socket members which corresponds to the longitudinal extent of at least one slide guide.

In operation, semiconductors $S_1$ and $S_2$ having their terminals fitted in the socket members 27 and 34, respectively, are energized by the electric circuits 22 and 24 including respective secondary windings 18 and 20 of the transformer 17. On this occasion, the voltages applied to respective semiconductors $S_1$ and $S_2$ are not affected by each other since the circuits including the respective semiconductors are electrically independent from each other.

Figure 2:
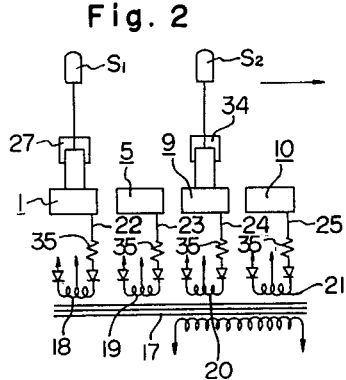
FIGS. 2 and 3 are schematic diagrams illustrating the operation of the apparatus with parts shown in respective operative positions.
Figure 3:
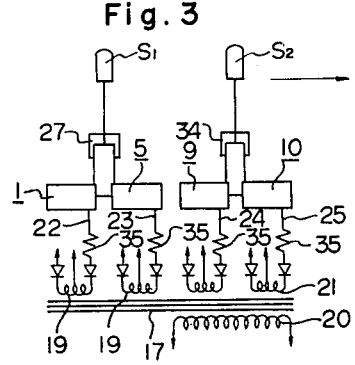

The socket members 27 and 34 carrying the respective semiconductors $S_1$ and $S_2$ are driven by a suitable means to slide along the guide track 26 in a direction indicated by the arrow while maintaining the initial spacing between the two members. As the socket members 27 and 34 proceed from their position shown in FIG. 2 to their position shown in FIG. 3, the contact fingers of one socket member 27 come in contact with both of the two adjacent slide guides 1 and 5 at the same time when the contact fingers of the other socket member 34 come in contact with both of the remaining two slide guides 9 and 10. Subsequently, as the socket members 27 and 34 continue to proceed, they come in contact with the slide guides 5 and 10, respectively. It is to be understood that, in such sliding movement of the socket members 27 and 34 in the direction of the arrow, the semiconductors $S_1$ and $S_2$ are kept electrically independent from each other, the voltage applied thereto not being affected by each other.

It will be appreciated from the foregoing that with the apparatus according to the invention the preheating time may be controlled by changing the speed at which the socket members slide.

It will also be appreciated that, since the semiconductors fitted to the respective socket members are included in a common electric circuit at no time in operation, any possible short circuiting of one semiconductor will not affect the voltage being applied to the other semiconductor, nor will impair the voltage source in any manner, if a suitable resistance 35 is inserted in each of the semiconductor circuits as illustrated.

Figure 4:
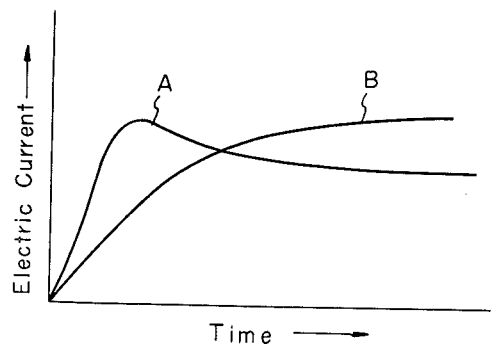
FIG. 4 illustrates characteristic curves of semiconductors obtained when a reverse voltage is continuously applied thereto.
Figure 5:
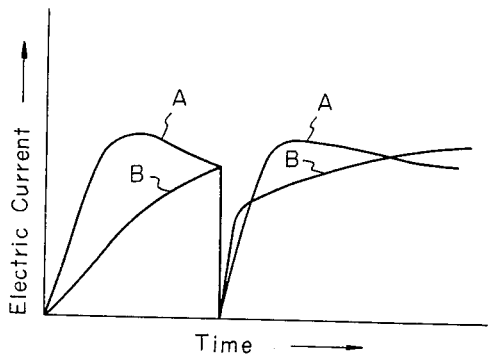
FIG. 5 illustrates similar curves obtained when the reverse voltage being applied thereto is interrupted and then reapplied.

FIGS. 4 and 5 show the effect of interrupting and resuming the application of a reverse or negative voltage to semiconductors, curve A designating one semiconductor and curve B designating another semiconductor. As may be seen, the interruption of the application of the reverse or negative voltage to the semiconductor alters the electric current curve from that obtained by applying such voltage continuously.

While one embodiment of the invention having four aligned slide guides has been shown and described, it will be understood that many changes and modifications may be made in practice without departing from the spirit or scope of the invention. For instance, a greater number of slide guides may preferably be employed to form a highly efficient semiconductor preheating apparatus which is adapted to operate for any desired preheating time, increasing the number of semiconductors to be measured in a predetermined time while enabling accurate determination of their characteristics.

What is claimed is:

1. Apparatus for preheating semiconductors for testing, comprising a number of slide guides each including spaced parallel electroconductive rail sections; transformer power supply means including secondary windings; said secondary windings being respectively connected to the rail sections of the slide guides to form independent circuits; said slide guides being aligned in longitudinally spaced apart relation to each other to form an interrupted slide track; apertured socket members; contact finger means extending between the apertures of the socket members and the respective rail sections of the slide track to receive terminals of the semiconductor to be tested; the spacing between adjacent socket members being at least equal to the longitudinal length of a slide guide; and the longitudinal widths of the contact fingers being at least equal to the gap spacing between the ends of the slide guides whereby continuous movement of the socket members along the slide track continuously applies voltages to the semiconductors without interruption.

2. Apparatus for preheating semiconductors for test purposes comprising a plurality of spaced apart longitudinally aligned slide guides, each comprising a plurality of rail sections; means for introducing electrical power to each slide guide; semiconductor socket means adapted to receive semiconductor terminals; contact means extending between the socket means and the rail sections of the slide guides and slidable along the rail sections for applying electrical power to the semiconductor terminals; the contact means having longitudinal dimensions in contact with the rail sections at least as long as the dimensions of the spacing between slide guides; and the spacing of adjacent socket means being greater than the longitudinal length of a rail section whereby continuous movement of the socket members along the slide track continuously applies voltages to the semiconductors without interruption.

References Cited by the Examiner

UNITED STATES PATENTS 3,009,109 11/1961 Jankowski _____ 324—158
3,039,604 6/1962 Bickel et al.

OTHER REFERENCES

Electronics, "High Speed Automatic Diode Tester," January 13, 1961, pages 93–95.

WALTER L. CARLSON, *Primary Examiner*.

G. S. KINDNESS, E. L. STOLARUN,
*Assistant Examiners*.